United States Patent [19]

Loqvist

[11] Patent Number: 4,664,564
[45] Date of Patent: May 12, 1987

[54] CHIP CUTTING TOOL

[75] Inventor: Kaj-Ragnar Loqvist, Fagersta, Sweden

[73] Assignee: Seco Tools AB, Fagersta, Sweden

[21] Appl. No.: 778,074

[22] Filed: Sep. 20, 1985

[30] Foreign Application Priority Data

Oct. 24, 1984 [SE] Sweden ................... 8405309

[51] Int. Cl.$^4$ ............................................. B26D 1/00
[52] U.S. Cl. ......................................... 407/72; 407/50; 407/91; 407/105; 407/110
[58] Field of Search .................. 407/72, 91, 109, 110, 407/103, 105, 50

[56] References Cited

U.S. PATENT DOCUMENTS

| 3,264,711 | 8/1966 | Jehring | 407/72 |
| 3,299,491 | 1/1967 | Hall | 407/103 |
| 3,785,021 | 1/1974 | Norgren | 407/72 |
| 4,090,801 | 5/1978 | Faber | 407/50 |
| 4,204,781 | 5/1980 | Johann | 407/105 |
| 4,558,974 | 12/1985 | Pano | 407/110 |

FOREIGN PATENT DOCUMENTS

| 059602 | 9/1982 | European Pat. Off. . | |
| 90224 | 10/1983 | European Pat. Off. | 407/105 |
| 8001813 | 4/1980 | Fed. Rep. of Germany . | |
| 368785 | 7/1974 | Sweden . | |
| 563229 | 12/1974 | U.S.S.R. | 407/110 |
| 994132 | 2/1983 | U.S.S.R. | 407/109 |

Primary Examiner—Leonidas Vlachos
Attorney, Agent, or Firm—Burns, Doane, Swecker & Mathis

[57] ABSTRACT

A chip cutting tool comprising a tool body and a resiliently yielding element for clamping a cutting insert to the tool body. The cutting insert is adapted to be clamped by making use of solely a portion of the available yielding movement and adapted to be loosened by further resilient yielding movement of the element at the same time as the cutting insert is clamped butt on butt to the tool body.

13 Claims, 19 Drawing Figures

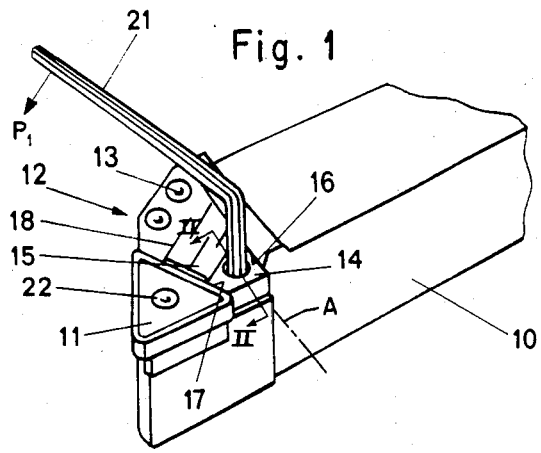
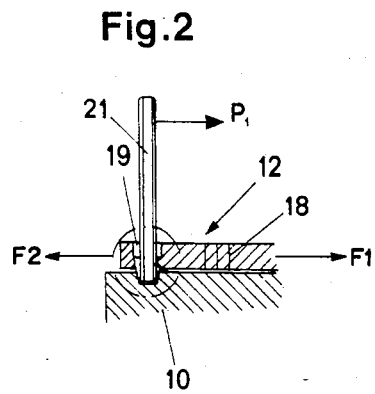
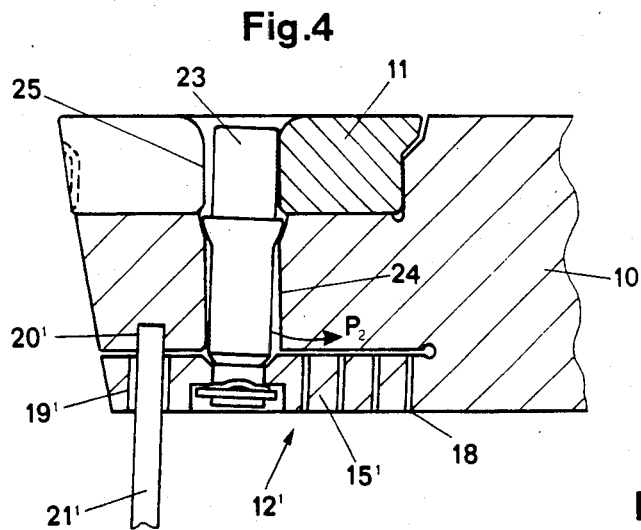
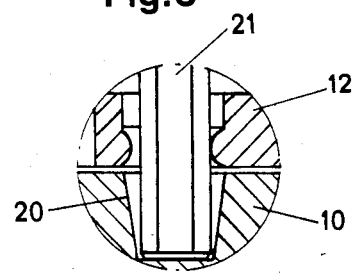
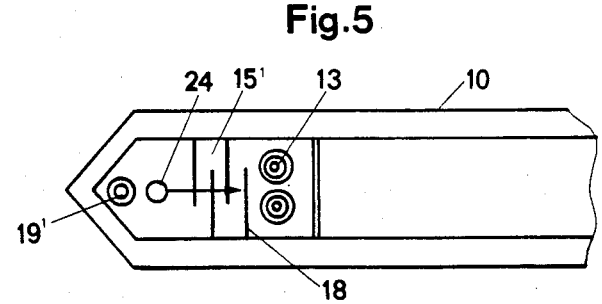
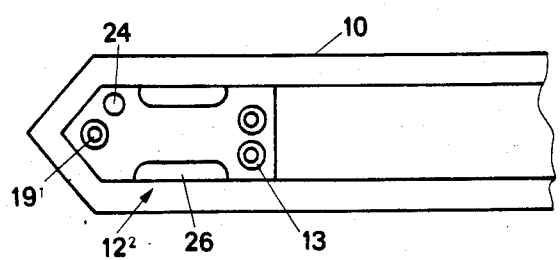

CHIP CUTTING TOOL

BACKGROUND AND OBJECTS OF THE INVENTION

The present invention relates to a chip cutting tool comprising a tool body and a resiliently yielding element for clamping a cutting insert to the tool body.

A cutting tool of this prior are type is disclosed in SE-B-No. 368785. In this prior art tool the clamping force is generated by bending of the resiliently yielding element which is formed as a clamping arm. However, this clamping force is insufficient in many applications. Similar cutting tools are known through, for instance, DE-U-No. 8001813 and EP-A-No. 59602, in which the cutting insert is provided with converging supporting surfaces, which cooperate with corresponding converging supporting surfaces on the clamping arm and the tool body. In these tools, however, no bending of the clamping arm ever occurs, neither before insertion of the cutting insert nor in connection therewith, since the cutting insert is clamped to the tool body by means of a wedging force. This force varies from one tool to another depending on tolerance variations of the cooperating supporting surfaces.

The object of the present invention is to provide a cutting tool wherein the resiliently yielding element generates a clamping force having a magnitude of satisfactory largeness and being independent of the operator.

Another object of the invention is to provide a cutting tool wherein the yielding element has butt on butt clamping characteristics.

A further object of the invention is to provide a cutting tool, which makes possible quick changes of cutting inserts which, when desired, can be automatized.

A still further object of the invention is to make possible use of a tooth pitch which is as small as possible in milling applications.

Other objects are to make possible elimination of loose parts and to generate a clamping force which automatically increases when vibrations arise.

THE DRAWINGS

The invention is described in detail in the following with reference to the accompanying drawings, in which various embodiments are shown by way of example. It is to be understood that these embodiments are only illustrative of the invention and that various modifications thereof may be made within the scope of the claims.

In the drawings,

FIG. 1 shows a perspective view of one embodiment of a tool according to the invention.

FIG. 2 is a section taken on the line II—II in FIG. 1.

FIG. 3 shows on an enlarged scale the encircled portion in FIG. 2.

FIG. 4 shows in section a portion of another embodiment of a tool according to the invention.

FIGS. 5 and 6 show views from below of different embodiments of tools of the basic type shown in FIG. 4.

DETAILED DESCRIPTION OF PREFERRED EMBODIMENTS OF THE INVENTION

Figure 7:
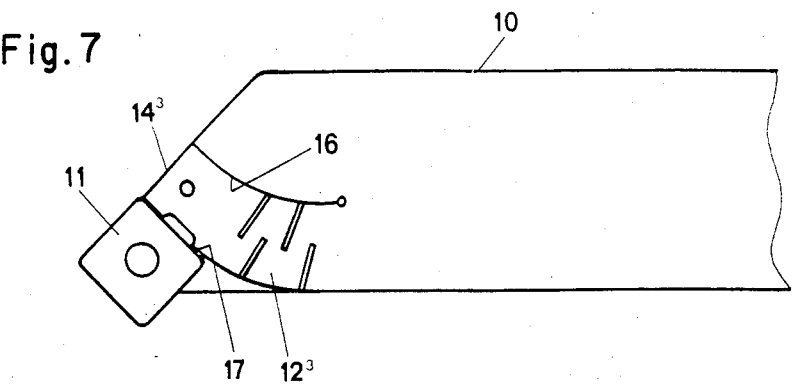
FIGS. 7-9 illustrate alternative embodiments of different embodiments of tools of the basic type shown in FIG. 1.

In the drawings, FIG. 1 shows a tool holder for external turning which comprises a tool body 10 on which a cutting insert 11 is clamped by means of a resiliently yielding element generally denoted by 12. The cutting insert 11 is provided with a traversing hole through which a pin 22 extends; said pin being secured to the tool body 10. When the cutting insert is clamped it is forced axially outwards against the pin 22 by means of the element 12. The element 12 includes an anchoring portion which is detachably connected to the tool body 10 by means of screws 13. Further, the element 12 is at its free end provided with a tapered wedge portion 14 which is forced between opposed supporting surfaces 16,17 on the tool body 10 and the cutting insert 11 by means of an intermediate portion 15 of the element 12 which lies along an axis A extending between the anchoring and wedge portions; said wedge means being integral with the element and said supporting surfaces converging in direction toward the free end of the element. The supporting surface 16 on the body 10 thus constitutes a reaction surface. Thus, the wedge means 14 is associated with the element 12 and includes wedge surfaces adapted to transmit the clamping force from the resilient portion 15 of the element to the cutting insert 11 via the supporting surface 17.

The intermediate portion 15 of the element 12 is provided with voids in the form of slots 18 extending alternatingly from opposed sides of the portion 15. Suitably, the slots 18 are filled with a sealing compound, such as silicon, for preventing the slots from becoming clogged up. At its free end, in the illustrated embodiment in the wedge means 14, the element 12 is provided with a traversing hole 19. A recess 20 is made in the tool body 10 substantially straight in front of the hole 19. When a cutting insert is to be changed a moment arm 21 is inserted through the hole 19 into tnhe recess 20. By swinging the moment arm 21 in the direction of the arrow $P_1$, arm 21 acts as a lever whereby the portion 15 provided with slots is compressed in a first direction F1, thereby releasing the cutting insert 11. Upon applying a new cutting insert on the pin 22 the portion 15, which acts as a stiff spring, is allowed to expand in a second direction F2 opposite the first direction F1, so that the cutting insert is forced against the pin 22 by means of the wedge means 14. As apparent from the above description only a fraction of the available resilient compression of the element 12 is utilized when the cutting insert 11 is clamped. When the cutting insert 11 is released a further fraction of the available compression is utilized, suitably the whole remaining available compression, which means that the moment arm 21 is swung to a fixed end position. The embodiment shown in FIGS. 1-3 has butt on butt function since the clamping force acting on the cutting insert 11 is transmitted over the supporting surfaces 16,17.

In the illustrated embodiment the change of cutting inserts can easily be automatized, in which case the tool holder is programmed to move against an abutment which compresses the resilient portion 15, whereupon a robot arm carries out the change of cutting inserts.

In FIG. 4 a tool holder is shown for internal turning in which the cutting insert 11 is clamped in its cutting position by means of a pin 23 which is swingably arranged in the tool body 10 and projects into a recess 25 in the cutting insert 11. In similarity with the embodiment according to FIGS. 1–3 the clamping system has a butt on butt function since the pin 23 is forced by means of the resilient member $12^1$ into abutment against a supporting surface in a hole 24 in the tool body 10 receiving the pin 23; said supporting surface being opposed to the supporting surface in the cutting insert 11. The pin 23 is rotated in the direction of arrow $P_2$ by means of a moment arm 21 against the spring action of the resilient portion $15^1$ of the element $12^1$. In the embodiment shown in FIG. 4 the element $12^1$ is integrally united with the tool body 10. The clamping force of the cutting insert 11 depends on the spring constant of the resilient portion $15^1$.

The embodiment shown in FIG. 5 coincides with that shown in FIG. 4 except that the resilient portion $15^1$ is connected to the tool body 10 by means of screws 13.

In the embodiment shown in FIG. 6 the resilient element $12^2$ is yieldingly bendable and connected to the tool body 10 by means of screws 13. The bending of the element $12^2$, which is made possible due to a void in the form of recess 26 in the element $12^2$, then occurs in the plane of the paper. The hole 24 for the pin 23 is eccentrically located so that, in the illustrated embodiment, the bending occurs upwards in FIG. 6. Upon such bending the element $12^2$ then generates an essential clamping force directed in the longitudinal direction of the element $12^2$, i.e. to the right in FIG. 6; said clamping force thus being generally seen transverse relative to the bending direction. This means that increasing vibrations increase the clamping force generated by the element $12^2$.

Figure 8:
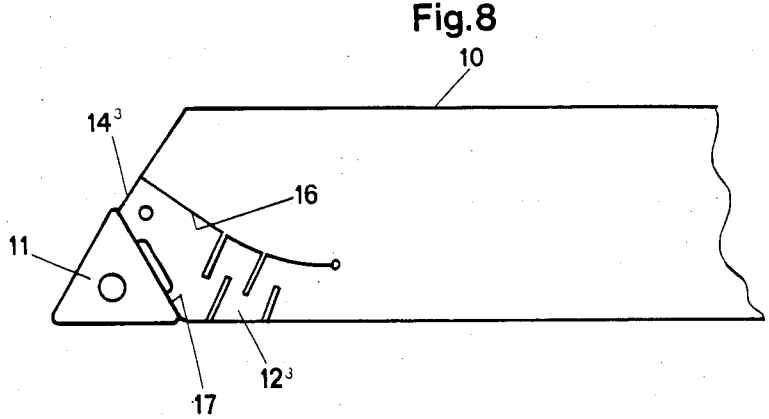
Figure 9:
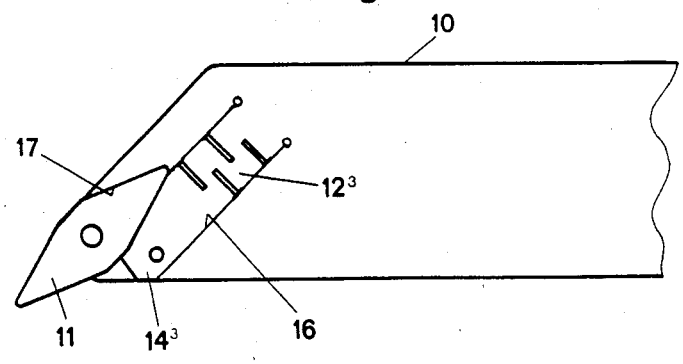

FIGS. 7–9 show three different embodiments which generate butt on butt clamping of the cutting insert 11. The resiliently yielding element $12^3$ terminates into a wedge means $14^3$ which is provided with opposed conical supporting surfaces intended to rest against the supporting surface 16 on the tool body 10 and the supporting surface 17 on the cutting insert 11.

Figure 11:
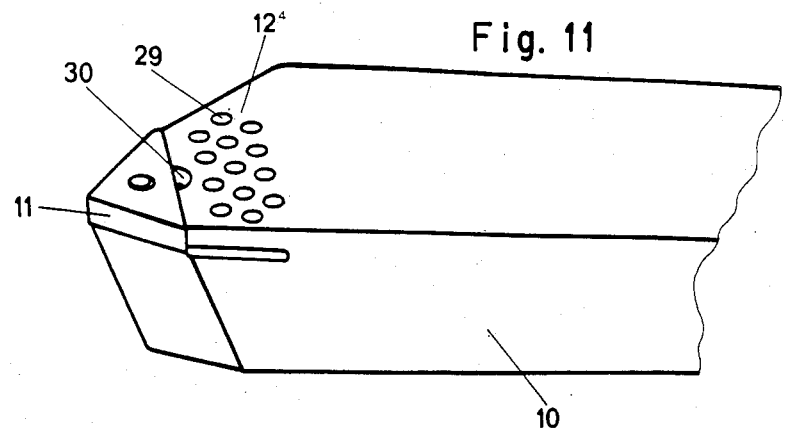
FIGS. 10 and 11 show perspective views of two further embodiments of a tool according to the invention.
Figure 10:
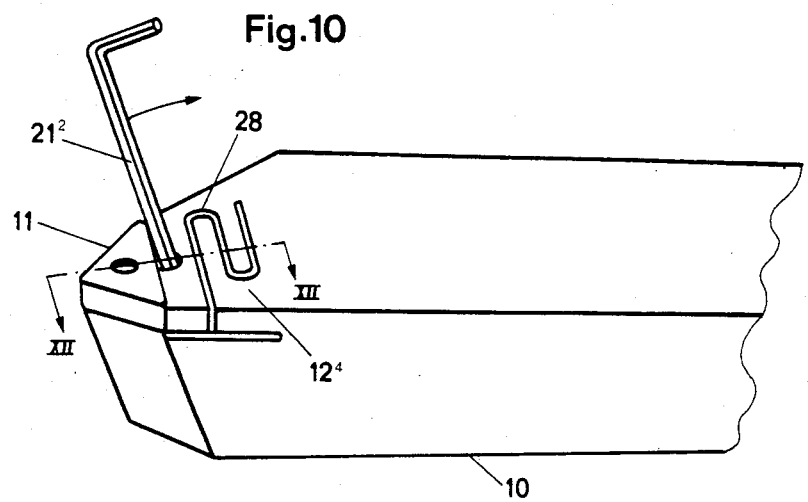
Figure 12:
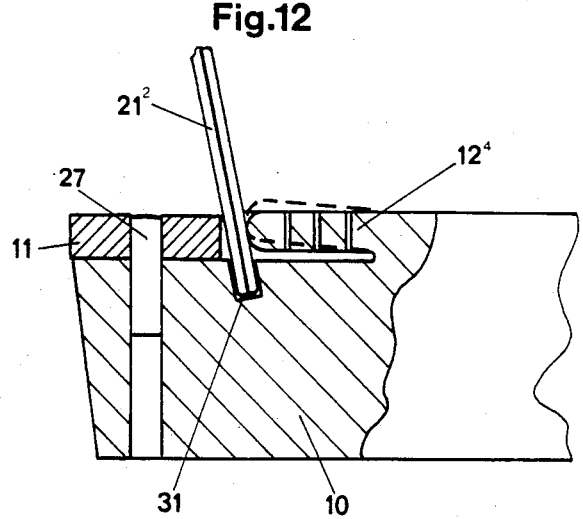
FIG. 12 is a section taken on the line XII—XII in FIG. 10.

In the embodiments shown in FIGS. 10–12 the cutting insert 11 is forced against a pin 27 by means of the resiliently yielding element $12^4$; said pin 27 being received in a hole in the cutting insert. In order to give the element $12^4$ desired spring characteristices it is provided with, for instance, a slot 28 traversing therethrough, FIG. 10, or holes 29 traversing therethrough, FIG. 11. In the embodiment according to FIG. 10 the one side, the upper one in the figure, of the element $12^4$ is stiff whereas the other side, the lower one in the figure, is resilient. Mounting and dismounting of the cutting insert 11 is carried out by means of a moment key $21^2$ which is inserted through a recess 30 in the element $12^4$ into a bore 31 in the tool body 10.

Figure 13:
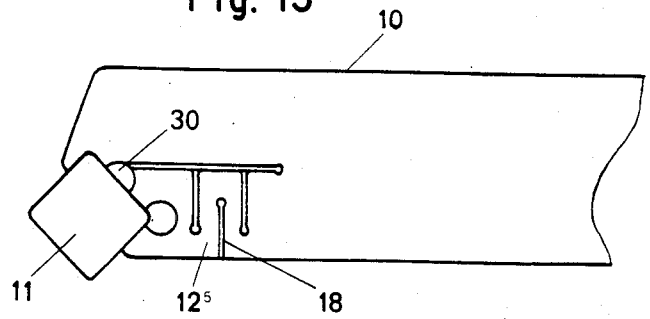
FIGS. 13-15 show views from above of different embodiments of tools of the basic type shown in FIGS. 10 and 11.
Figure 14:
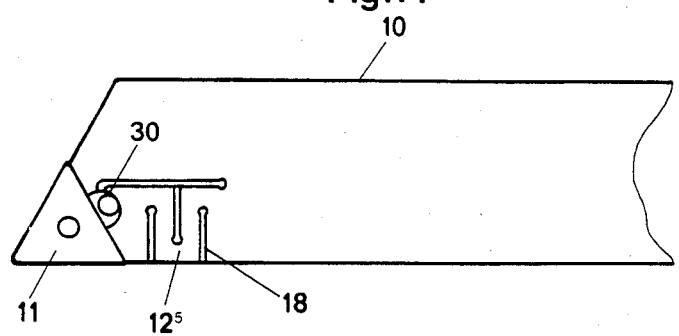
Figure 15:
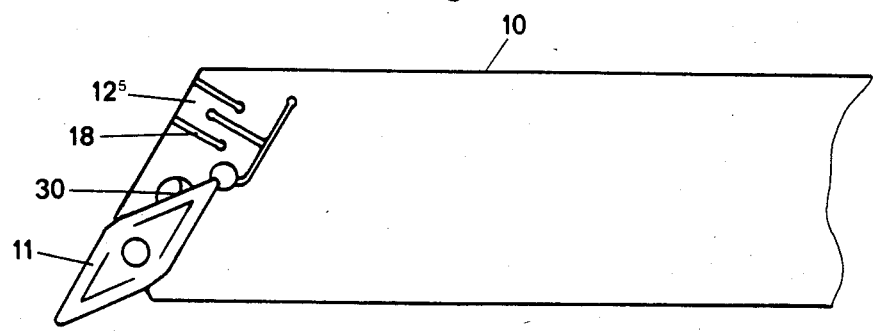

In FIGS. 13–15 alternative embodiments are shown of basically the same types as those shown in FIGS. 10 and 11. In similarity with the embodiments according to FIGS. 1, 5, 7, 8 and 9 the element $12^5$ is provided with slots 18 alternating from opposed sides.

Figure 16:
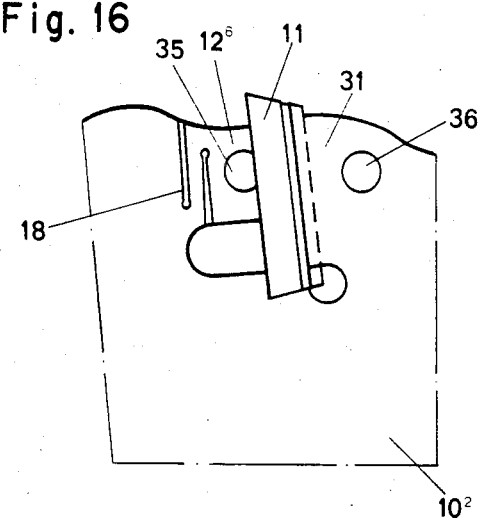
FIG. 16 shows a partial side view of still another embodiment of a tool according to the invention.
Figure 17:
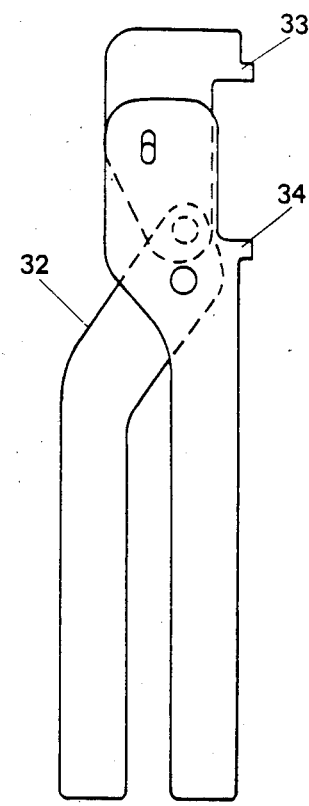
FIG. 17 shows a key for detachment and insertion of a cutting insert in the tool according to FIG. 16.

In FIG. 16 the invention is shown applied in rotary cutting tools, preferably thin circular saws. The resilient element $12^6$ forces the cutting insert 11 to abutment against a stiff portion 31 of the circular saw $10^2$. This means that unintended variations in the clamping force are substantially eliminated since this force depends only on grinding tolerances and the hardening method. The cutting insert 11 can be released, for instance, by means of a moment key 32 shown in FIG. 17; said moment key having projections 33,34 adapted for insertion into hole 35,36 in the circular saw $10^2$.

Figure 18:
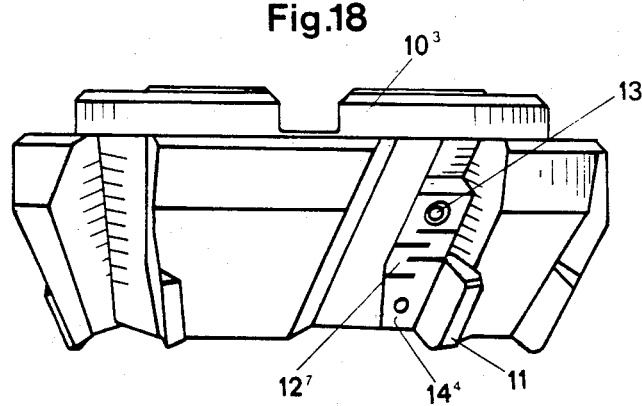
FIGS. 18 and 19 show side views of two further embodiments of tools according to the invention.

In FIG. 18 the invention is shown applied on a milling cutter $10^3$, where the cutting insert 11 is forced against a supporting surface in the cutter body by means of the resilient element $12^7$ and the wedge means $14^4$. In similarity with the embodiment according to FIG. 1 the element $12^7$ has butt on butt function. Further, an automatized change of inserts is made possible in a simple manner by programming the milling cutter to move against an abutment so that, when correct coordinates are reached, a robot arm obtains a go-ahead to carry out change of cutting inserts. The design also makes possible a very close tooth pitch.

Figure 19:
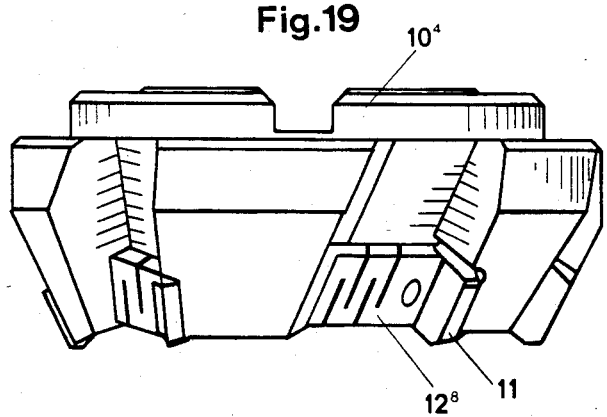

In FIG. 19 the invention is shown applied on a milling cutter $10^4$ in which the element $12^8$ does not have butt on butt function, since the direction in which the element is compressed coincides with the direction of the clamping force.

I claim:

1. In a chip cutting tool which cuts by means of a clamped-in-place cutting insert, the tool comprising a tool body carrying an abutment surface, a fixed reaction surface, and an insert-receiving site spaced from the reaction surface and arranged to receive the insert such that a surface of the insert is spaced from and faces the reaction surface; and a resiliently yieldable clamping means for exerting a clamping force against the insert, said clamping means being of one-piece construction comprising integrally formed anchoring, wedge, and resilient portions, the resilient portion disposed intermediate the anchoring and wedge portions along an axis extending through the anchoring and wedge portions, the anchoring portion being joined to the tool body, the wedge portion being movable relative to the anchoring portion in a first direction along the axis in response to the application of an external force which stresses the resilient portion in a manner causing the resilient portion to store energy, the wedge portion being disposed between the insert surface and the reaction surface and including wedge surfaces engaging the insert surface and the reaction surface, respectively, when urged thereagainst by the resilient portion in a second direction opposite the first direction when the external force is released, so that the wedge portion exerts against the insert a clamping force extending transversely relative to the axis for clamping the insert against the abutment surface.

2. A tool according to claim 1, wherein the anchoring portion is detachably connected to the tool body by a fastener.

3. A tool according to claim 1, wherein the resilient portion comprises voids disposed between the anchoring portion and the wedge portion for rendering the resilient portion resiliently compressible.

4. A tool according to claim 3, wherein the voids comprise slots.

5. A tool according to claim 4, wherein the slots extend transversely relative to the first direction.

6. A tool according to claim 5, wherein the wedge portion includes opposite edges, at least one of the slots extending from one edge, and at least another of the slots extending from the other edge.

7. A tool according to claim 3, wherein the wedge portion includes opposite edges, the voids comprising recesses formed in the opposite edges.

8. A tool according to claim 1, wherein the tool body includes a face along which the wedge portion is slidable, a first hole formed in the face, and a second hole formed through the wedge portion and arranged to be aligned with the first hole when the clamping element is in a clamping condition, the aligned first and second holes adapted to receive a manual tool which comprises a lever for compressing the clamping means.

9. A tool according to claim 1, wherein the insert surface and the reaction surface are convergent in a direction away from the anchoring portion to include an acute angle therebetween, the wedge surfaces including the same acute angle therebetween.

10. A tool according to claim 1, wherein each of the tool body and insert includes a hole, the abutment surface comprising a pin extending through the holes in the insert and tool body.

11. A tool according to claim 1, wherein the first direction is toward the anchoring portion.

12. In a chip cutting tool which cuts by means of a clamped-in-place cutting insert, the tool comprising a tool body carrying an abutment surface, a fixed reaction surface, and an insert-receiving site spaced from the reaction surface and arranged to receive the insert such that a surface of the insert is spaced from and faces the reaction surface; and a resiliently yieldable clamping means for exerting a clamping force against the insert, said clamping means comprising an anchoring portion joined to the tool body and a wedge portion movable toward the anchoring portion when the clamping means is resiliently yieldably compressed in a first direction in response to the application of an external force, the wedge portion being disposed between the insert surface and the reaction surface and including wedge surfaces engaging the insert surface and the reaction surface, respectively, in response to an expansion of the clamping means in a second direction opposite the first direction when the external force is released, so that the wedge portion is urged in the second direction to exert against the insert a clamping force extending transversely relative to the first direction for clamping the insert against the abutment surface, the wedge portion and the anchoring portion comprising integral portions of a clamping element which defines the clamping means, the clamping element comprising voids disposed between the anchoring portion and the wedge portion for rendering the element resiliently compressible.

13. In a chip cutting tool which cuts by means of a clamped-in-place cutting insert, the tool comprising a tool body carrying an abutment surface, a fixed reaction surface, and an insert-receiving site spaced from the reaction surface and arranged to receive the insert such that a surface of the insert is spaced from and faces the reaction surface; and a resiliently yieldable clamping means for exerting a clamping force against the insert, said clamping means comprising an anchoring portion joined to the tool body and a wedge portion movable toward the anchoring portion when the clamping means is resiliently yieldably compressed in a first direction in response to the application of an external force, the wedge portion being disposed between the insert surface and the reaction surface and including wedge surfaces engaging the insert surface and the reaction surface, respectively, in response to an expansion of the clamping means in a second direction opposite the first direction when the external force is released, so that the wedge portion is urged in the second direction to exert against the insert a clamping force extending transversely relative to the first direction for clamping the insert against the abutment surface, the tool body including a face along which the wedge portion is slidable, a first hole formed in the face, and a second hole formed through the wedge portion and arranged to be aligned with the first hole when the clamping element is in a clamping condition, the aligned first and second holes adapted to receive a manual tool which comprises a lever for compressing the clamping means.

* * * * *